United States Patent [19]
Junk

[11] Patent Number: 5,518,679
[45] Date of Patent: May 21, 1996

[54] METHOD AND APPARATUS FOR MAKING A COMPONENT HAVING INTERIOR AND EXTERIOR THREADS

[75] Inventor: Richard A. Junk, Elkhorn, Wis.

[73] Assignee: Sta-Rite Industries, Inc., Delavan, Wis.

[21] Appl. No.: 373,437

[22] Filed: Jan. 17, 1995

[51] Int. Cl.⁶ .......................... B29C 45/44; B29C 39/34
[52] U.S. Cl. .......................... 264/318; 264/334; 249/59; 249/68; 425/556; 425/577; 425/438; 425/443; 425/DIG. 58
[58] Field of Search .................... 264/318, 334; 249/59, 67, 68; 425/577, 556, 438, 443, DIG. 58

[56] References Cited

U.S. PATENT DOCUMENTS

| | | |
|---|---|---|
| 2,146 | 6/1841 | Luther . |
| 6,993 | 2/1876 | Mason . |
| 84,112 | 11/1868 | Hallowell .............................. 249/59 |
| 1,887,933 | 11/1932 | Conner et al. . |
| 2,605,317 | 7/1952 | Tiscione . |
| 2,751,237 | 6/1956 | Conley . |
| 3,387,323 | 6/1968 | Wyllie et al. . |
| 3,481,000 | 12/1969 | Barfuss ............................... 425/438 |
| 3,528,637 | 9/1970 | Bedford, Jr. . |
| 3,905,416 | 9/1975 | Hammer .............................. 264/318 |
| 4,125,246 | 11/1978 | von Holdt . |
| 4,240,498 | 12/1980 | Frenette . |
| 4,755,342 | 7/1988 | Biermann . |
| 4,822,270 | 4/1989 | Bonissone et al. . |
| 4,917,846 | 4/1990 | Takase et al. . |
| 4,938,679 | 7/1990 | Pietrorazio . |
| 5,135,700 | 8/1992 | Williams et al. . |
| 5,223,158 | 6/1993 | Lizenby . |
| 5,405,282 | 4/1995 | Pflager .................................. 249/59 |

*Primary Examiner*—Jill L. Heitbrink
*Attorney, Agent, or Firm*—Jansson & Shupe, Ltd.

[57] ABSTRACT

Disclosed is a new method for making a component having interior and exterior threads. Such method includes the steps of providing a thread-forming apparatus having first and second circumferential threaded portions defining a space between them. Such space is filled with a flowable material, e.g., hot plastic, which is permitted to solidify and form the component. The apparatus and the component are then separated from one another by rotating such apparatus so that both threaded portions unscrew from the component. The finished component has interior and exterior threads which are simultaneously formed and substantially free of flashing. The new thread-forming apparatus has a first threaded portion and a pocket. A plug is in the pocket and has a second threaded portion spaced from the first threaded portion.

10 Claims, 5 Drawing Sheets

METHOD AND APPARATUS FOR MAKING A COMPONENT HAVING INTERIOR AND EXTERIOR THREADS

FIELD OF THE INVENTION

This invention relates generally to static molds and, more particularly, to shaping of plastic articles in such molds.

BACKGROUND OF THE INVENTION

As evidenced by U.S. Pat. No. 5,135,700 (Williams et al.), molded products having concentric interior and exterior threads are quite common. The Williams et al. patent relates to a method and apparatus for molding a part, e.g., a faucet valve "T," having both interior and exterior threads. The interior threads are formed by a core insert, the exterior threads are formed by the mold halves and the mold "parting line" is generally perpendicular to the threads and parallel to the long axis of the valve.

U.S. Pat. No. 5,223,158 (Lizenby) relates to a nut casting apparatus. Upon a superficial analysis, such apparatus appears to involve molding both interior and exterior threads. A careful analysis of the patent confirms that only exterior threads are molded. Such molding includes placing an Acme-threaded casting screw into a mold cavity and filling the space between the mold and the screw with polymer.

Centrifugal sump pumps comprise another product having concentric interior and exterior threads. More specifically, the assignee of this invention makes and sells impeller-equipped centrifugal sump pumps having what is called an "upper volute." Such upper volute forms a major part of the impeller housing and when mated with a similarly-shaped lower volute defines the pumping chamber in which the impeller rotates.

The upper volute has a tube-like upstanding outlet port or boss with threads on the interior circumference. Such threads permit attachment of a discharge pipe.

The entire shape of an upper volute is formed by two mold halves which are clamped together prior to injecting the plastic into the cavity to form the volute. Known practice has been to make the mold halves (and the "half-cavities" in them) in such a way that the mold faces (those portions of the mold halves which abut one another when the mold is clamped) are coincident with a plane which diametrically bisects the upstanding port boss.

To put it another way, each half-cavity has a surface which forms all of the length and one-half of the circumference of the boss. The interior threads are formed by mounting a plug-like insert in the mold. When the mold halves are separated from one another, the insert is pulled out.

While generally satisfactory for making an outlet port having only interior threads, such known approach would present a few problems if used to make a sump pump outlet port having both interior and exterior threads. One such problem is that because the mold "parting line" (or perhaps more accurately, the parting plane) would be diametrical with the exterior threads (as well as with the interior threads), flashing would occur on such exterior threads. Such flashing, which would be very visibly apparent, would define a knife-like ridge running generally perpendicular to the threads and parallel to the long axis of the boss. Such flashing must be removed since it would impair (or, in an aggravated case, absolutely prohibit) attachment of a threaded pipe to the boss.

Another potential problem is that there may be some shifting of the insert during the molding process and the interior and exterior threads may not be concentric. And if that occurs, the wall thickness of the port boss is not uniform and threads are likely to be mismatched. If an insert shifts position significantly, it is not all that uncommon to find a wall thickness which is unacceptably thin and the part must be discarded.

An apparatus and method which addresses some of the problems and shortcomings of the prior art would be an important advance.

OBJECTS OF THE INVENTION

It is an object of the invention to provide an apparatus and method overcoming some of the problems and shortcomings of the prior art.

Another object of the invention is to provide an apparatus and method which eliminates thread flashing on exterior threads.

Another object of the invention is to provide an apparatus and method which avoid mold insert "decentering" and thereby maintains uniform wall thickness.

Still another object of the invention is to provide an apparatus and method which permits simultaneous molding of interior and exterior threads while yet reducing scrap costs.

Yet another object of the invention is to provide an apparatus and method which can be used to make a wide variety of components having interior and exterior threads. How these and other objects are accomplished will become more apparent from the following descriptions and from the drawing.

SUMMARY OF THE INVENTION

Aspects of the invention involve a method for making a component such as the outlet port of a pump which has interior and exterior threads. The method includes the steps of providing a thread-forming apparatus having first and second threaded portions defining a space between them. Using injection molding techniques, for example, the space is filled with a flowable material which later solidifies to form the component.

The apparatus and the molded component are then separated from one another by withdrawing the apparatus from the component. The resulting component has interior and exterior threads which are simultaneously formed, concentric and free of flashing.

In a more specific aspect of the method, the providing step includes the steps of providing a thread-forming apparatus in a cavity for molding the component. Such apparatus has a pocket therein which is bounded by the first threaded portion and a plug is provided in the pocket. The plug, which includes the second threaded portion, is placed in the pocket and secured therein by a pin or the like.

The first threaded portion has a thread crest, the second threaded portion has a thread root and the crest and the root are substantially in registry with one another. This relationship of crest and root becomes more important when there is a relatively small difference between the nominal thread diameters of the interior and exterior threads.

In a sump pump, the relationship of crest and root becomes important when the difference between the nominal thread diameters of the interior and exterior threads is not in excess of about 15–20% or, in a specific embodiment, not in excess of about one-quarter inch. The reason therefor is that when the crest and root are so arranged with respect to one another, the wall thickness between interior and exterior threads is acceptable, notwithstanding the aforementioned relatively small difference in thread diameter.

In another, more specific aspect of the inventive method, the withdrawing step includes rotating the first and second threaded portions. In a highly preferred method, the first and second threaded portions are rotated substantially simultaneously and at the same speed. Rotation is in a direction to unscrew the threaded portions from the component and to move the threaded portions away from the cavity.

When the threaded portions are both part of what might be termed a unitary structure for inserting such portions into the cavity and withdrawing such portions at the same time and at the same rate, the interior and exterior threads must have the same pitch. On the other hand, if the two threaded portions are capable of independent rotation, the interior and exterior threads need not be of the same pitch.

The inventive apparatus has a perimeter section with a first threaded portion and a pocket. A plug is removably mounted in the pocket and has a second threaded portion spaced from the first threaded portion. The perimeter section and plug are supported by an elongate shaft portion with a gear formed thereon for rotating the apparatus.

When making the upper volute of a sump pump housing, the molds are configured in such a way that most of the structure of such upper volute is formed by a properly-shaped cavity in only one of the mold halves. The other mold half abuts the first at a plane coincident with the lower rim-like edge of the volute. (That is to say, the mold parting plane is generally perpendicular to the long axis of the outlet port.) Any flashing which occurs is along the lower rim-like edge of the volute.

Further details of the invention are set forth in the following detailed description and in the drawing.

DETAILED DESCRIPTION OF PREFERRED EMBODIMENTS

Figure 1:
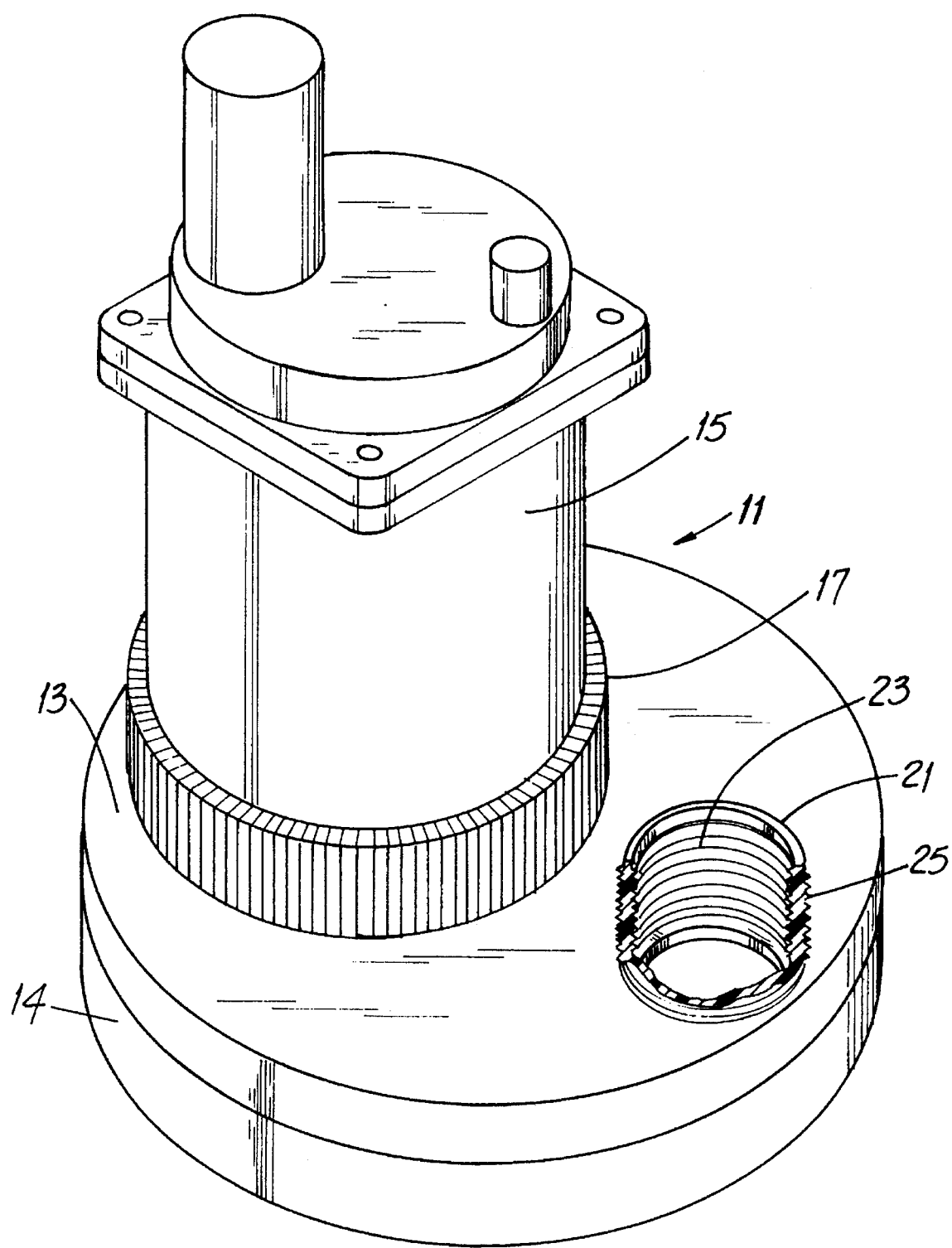
FIG. 1 is a perspective view, partly in cross-section, of an exemplary centrifugal sump pump.
Figure 3:
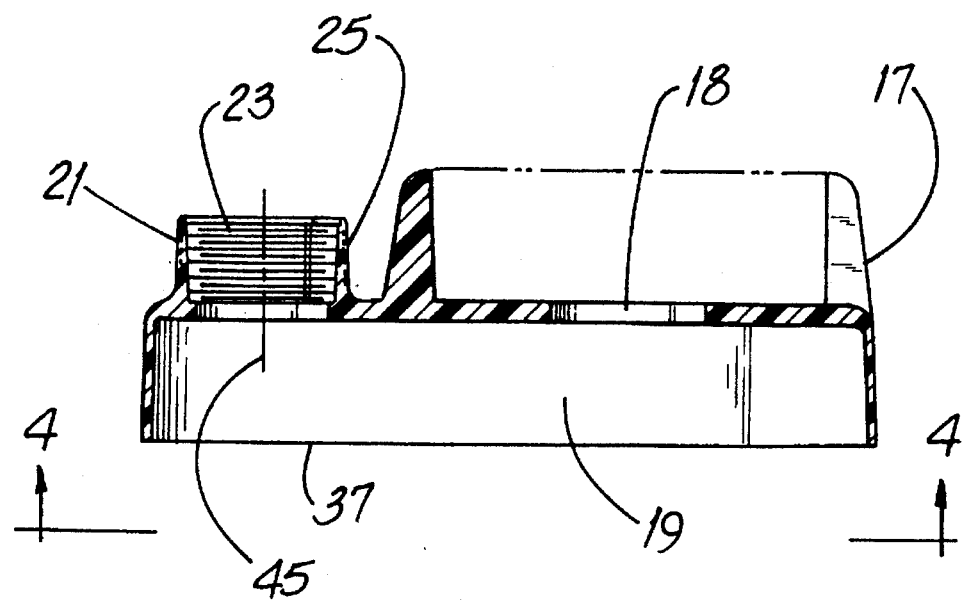
FIG. 3 is a section view of the volute of FIG. 2 taken along the viewing plane 3—3 thereof.
Figure 4:
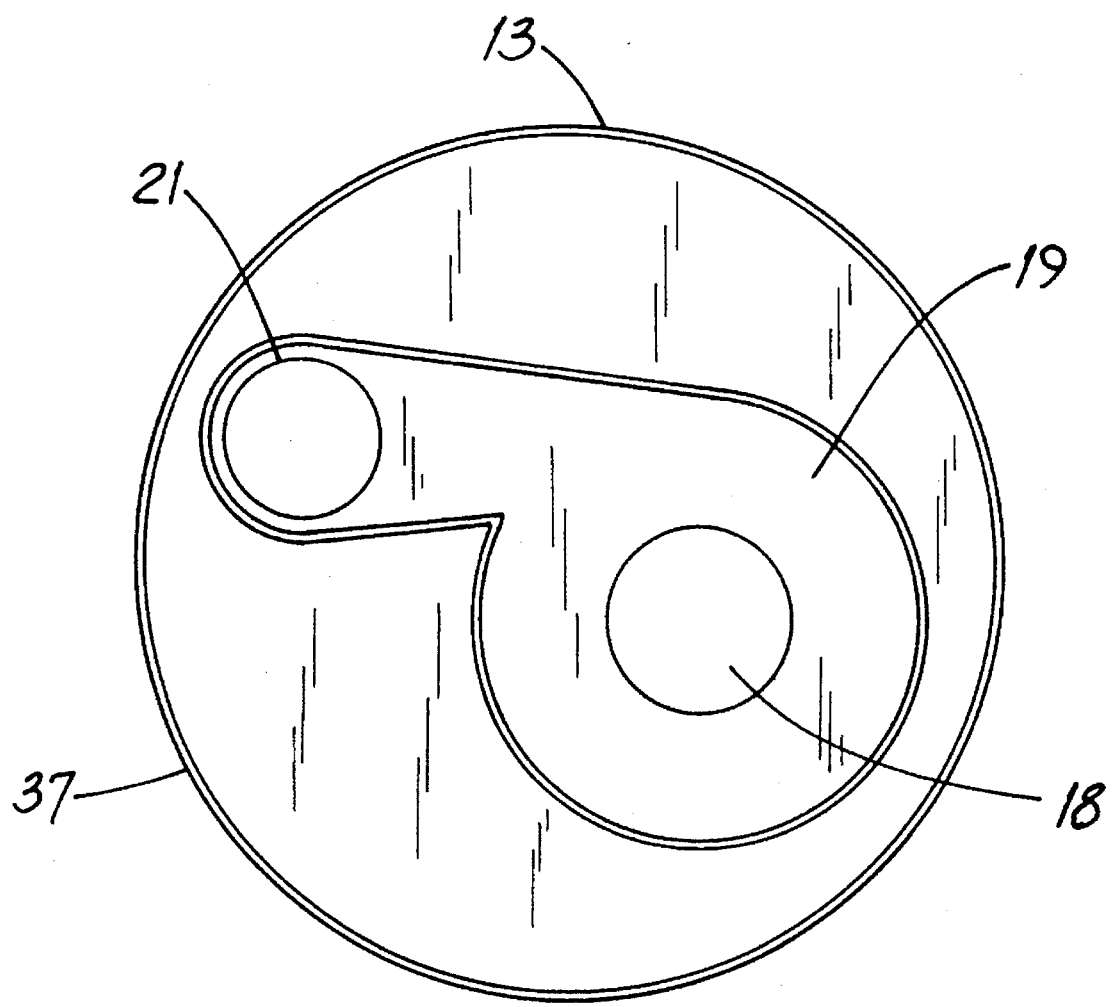
FIG. 4 is a bottom plan view, in full representation, of the volute of FIGS. 2 and 3 taken generally along the viewing plane 4—4 of FIG. 3.

Before describing the new apparatus 10 and method, it will be helpful to have an understanding of an exemplary component made therefrom. Referring to FIGS. 1, 3 and 4, a sump pump 11 is placed in and used to pump water from a below-floor pit or "sump" in a residential basement, for example. In many parts of the United States, building codes require such sumps and pumps.

The pump 11 has an upper volute 13 and a lower volute 14 defining an interior chamber for housing a pump impeller driven by an electric motor 15. When the motor 15 is energized (by a float signalling a particular water level in the sump), water is drawn in through the grill work 17 and through the opening 18 into the pumping chamber 19 from whence it is urged through the outlet port 21 by the impeller. Such port 21 is connected to a pipe leading to the exterior of the building.

Figure 2:
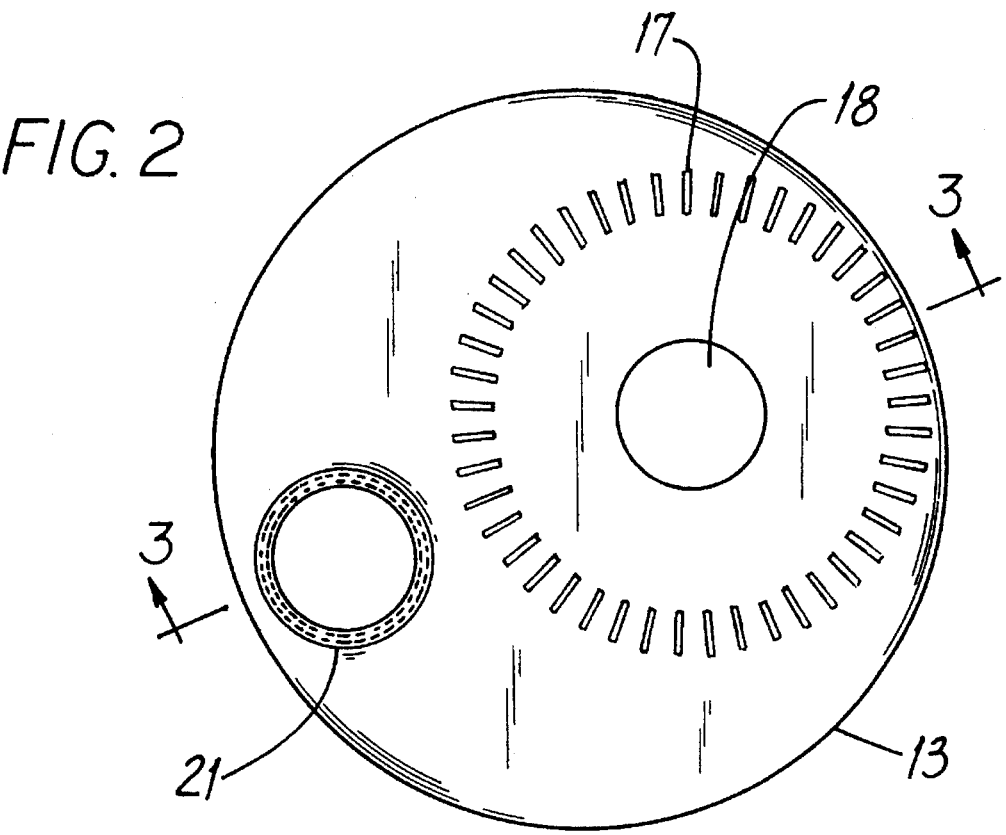
FIG. 2 is a top plan view of the upper volute of the pump of FIG. 1. Surfaces of threads are shown in dashed outline.

FIGS. 2, 3 and 4 show the molded upper volute 13 including the grill work 17, the opening 18 through which water flows from the grill work 17 into the interior chamber 19 and the outlet port 21 from which pumped water is discharged. Referring particularly to FIG. 3 and also to FIG. 5, the outlet port 21 has interior threads 23 and exterior threads 25, either of which may be used for attaching a discharge pipe.

(It is to be appreciated that particularly with poly vinyl chloride (PVC) pipe, an adapter is often used between the pipe and the sump pump 11. The adapter has a smooth interior at one end and can be fitted over and adhered to the pipe using a known solvent. The other end of the adapter is threaded on the inside or on the outside for attachment to the port 21. As used in this specification, descriptions relating to connection of a pipe to the port 21 means connecting the pipe to the port 21 either directly or by using an intervening adapter.)

In one specific embodiment, the interior threads 23 are 1.25 inch national pipe thread (NPT) and the exterior threads 25 are 1.50 inch NPT. Thus, a discharge pipe (or an adapter) having 1.50 inch NPT interior threads may be attached to the port threads 25 or a pipe having 1.25 inch NPT exterior threads may be attached to the port threads 25.

Figure 5:
FIG. 5 is an enlarged cross-sectional view of a portion of the interior and exterior threads of the pump outlet port. Parts are broken away.

In the specific example where the nominal diameter of the interior threads 23 is in the range of 80–85% or more of the nominal diameter of the exterior threads 25, it is preferred that the crest 27 of the exterior threads 25 and the root 29 of the interior threads be substantially in registry with one another as shown in FIG. 5. In that way, the wall thickness is maximized and the thread-forming apparatus 10 described below is configured to achieve such registry. In the case of threads 23 and 25 having nominal diameters which differ by more than 15–20%, such thread registry is not as critical, at least not in sump pump applications.

Figure 6:
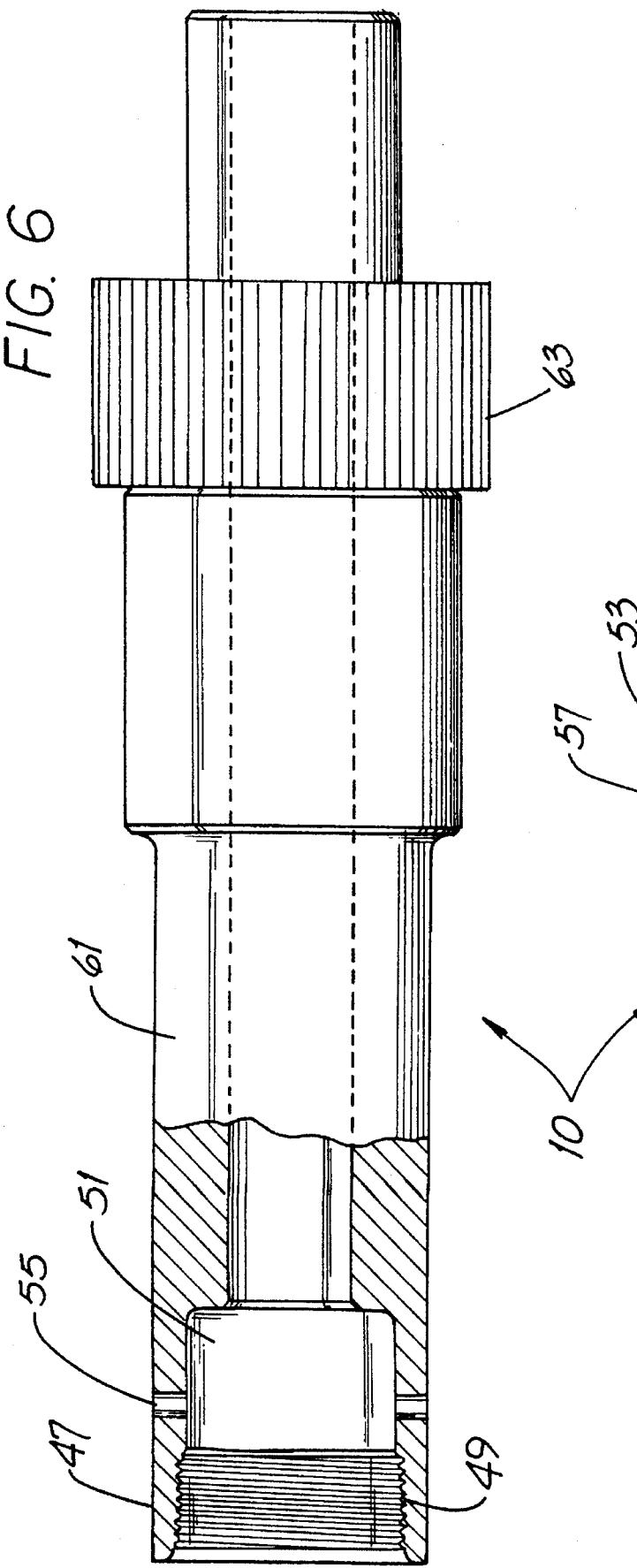
FIG. 6 is a side elevation view, partly in section of one component of the thread-forming apparatus. Surfaces of parts are shown in dashed outline.
Figure 7:
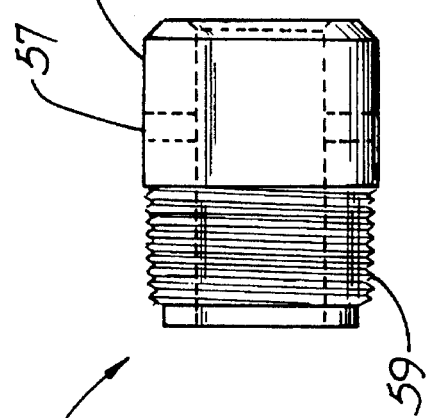
FIG. 7 is a side elevation view of the thread-forming plug used with the component of FIG. 6. Surfaces of parts are shown in dashed outline.
Figure 8:
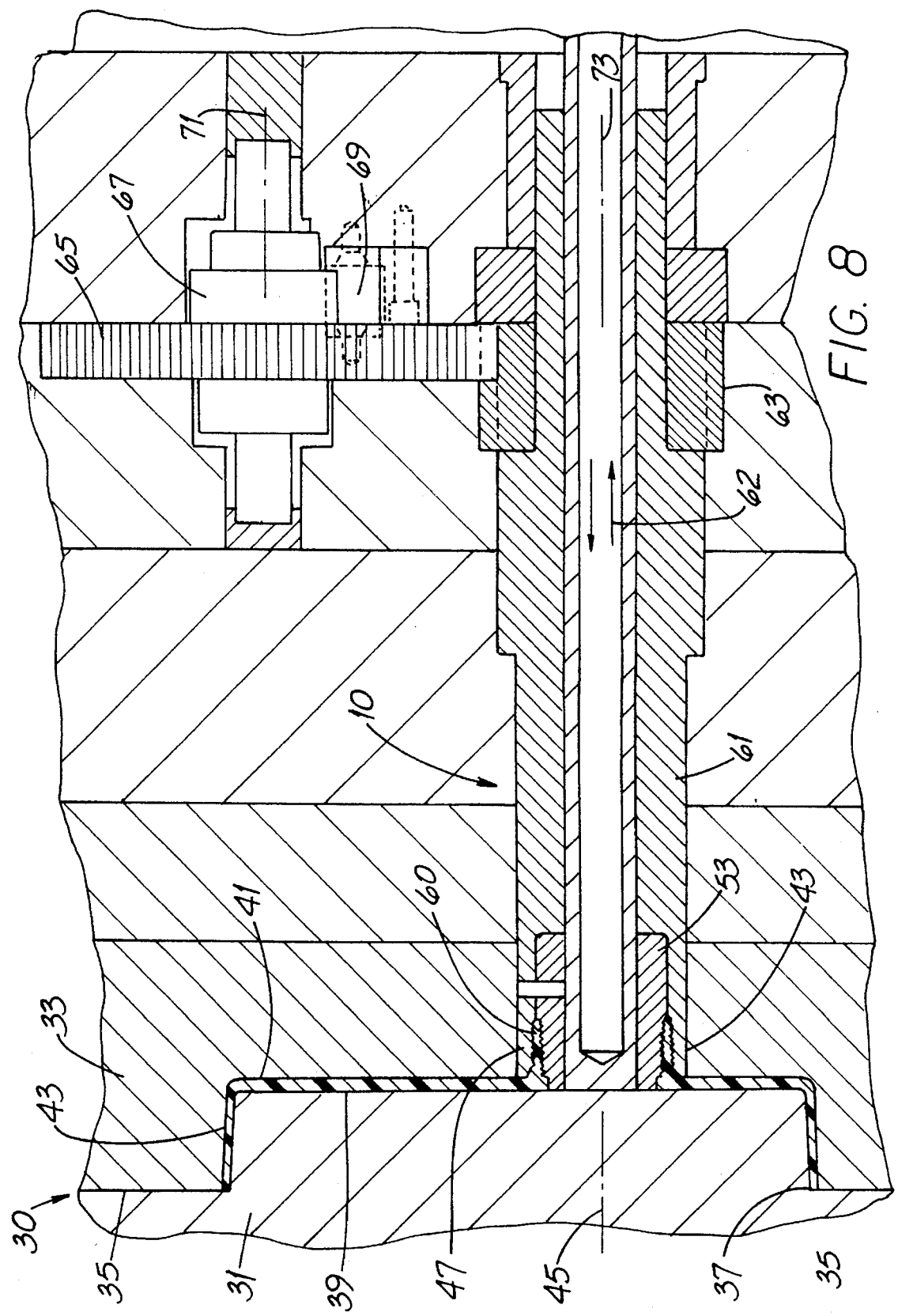
FIG. 8 is a side elevation view, partly in section, of the mold halves and thread-forming apparatus used to make an exemplary component having interior and exterior threads. Surfaces of parts are shown in dashed outline.

Referring next to FIGS. 6, 7 and 8, details of the mold arrangement and of the new thread-forming apparatus 10 will now be described. The mold 30 has first and second halves 31 and 33, respectively, which coact (along with the apparatus 10) to form the upper volute 13. When the mold 30 is open for discharging the volute 13, the first half 31 moves leftward (as shown in FIG. 8) and is spaced from the second half 33.

When the mold halves 31, 33 are closed against one another, the line 35 denotes the mold "parting line" which is at a plane along the bottom rim 37 of the volute 13. The line 39 denotes the surface of the first mold half 31 while the line 41 denotes the surface of the second mold half 33. The cavity 43 between the halves 31, 33 is injected with flowable plastic material to make the volute 13. The mold parting line 35 (or, more accurately, the parting plane) is generally perpendicular to the long axis 45 of the outlet port 21 and any flashing which occurs is along the rim 37 of the volute 13.

By means described below, the apparatus 10 is inserted into the cavity 43 prior to "shooting" the flowable plastic material. Such apparatus 10 has a perimeter section 47 with a first interiorly-threaded portion 49 and a pocket 51. Such portion 49 molds the exterior threads 25 on the port 21.

A generally-cylindrical plug 53 is sized and shaped to fit into and be removed from the pocket 51 with slight sliding clearance. When the plug 53 is in the pocket 51, it is retained there by a pin extending into the holes 55, 57.

The plug 53 has a second threaded portion 59 spaced from the first threaded portion 49. Such second portion 59 molds the interior threads 23 on the port 21 and it is now apparent that when plastic is injected into the space 60 between the threaded portions 49, 59, the outlet port 21 is formed with both interior and exterior threads 23, 25.

The perimeter section 47 and plug 53 are supported by an elongate shaft portion 61 for positioning such section 47 and plug 53. Such portion 61 has a pair of parallel coolant passages as represented by the arrows 62 and also has a gear 63 formed thereon for rotating the apparatus 10. The gear 63 is driven by a mating bull gear 65, the pinion gear 67 of which is driven by a linear, geared "rack" 69.

When the rack 69 moves (into and out of the drawing sheet as viewed in FIG. 8), the pinion gear 67 and bull gear 65 rotate about an axis 71 coincident with the drawing sheet. Such rotation drives the apparatus 10 which also rotates about an axis 73 coincident with the drawing sheet. There is also an actuator (not shown) for moving the apparatus 10 linearly along such axis 73. Thus, the apparatus 10 can be extended into or out of the cavity 43 and rotated in either direction.

Other aspects of the invention involve a method for making a component such as the exemplary pump volute 13 with its outlet port 21. The method includes the steps of providing a thread-forming apparatus 10 having first and second threaded portions 49, 59 defining a space 60 between them. Using the aforementioned injection molding techniques, for example, the space 60 is filled with a flowable material which later solidifies to form the port 21. (It is apparent from the foregoing that in FIG. 8, the space 60 has been filled with such material.)

The apparatus 10 and the molded component, e.g., the volute 13 are then separated from one another by withdrawing the apparatus 10 from the volute 13. The resulting volute has interior and exterior threads 23, 25 which are simultaneously formed, concentric and free of flashing.

More specifically, the providing step includes the steps of providing a thread-forming apparatus 10 in a cavity 43 for molding the volute 13. The plug 53, which includes the second threaded portion 59, is placed in the apparatus pocket 51 and secured therein.

The withdrawing step includes rotating the first and second threaded portions 49, 59 by extending the rack 69, rotating the bull gear 65 and thus rotating the pinion 67 and the shaft portion 61. In a highly preferred method, the first and second threaded portions 49, 59 are rotated substantially simultaneously and at the same speed. Rotation is in a direction to unscrew the threaded portions 49, 59 from the volute 13 and to move the threaded portions 49, 59 away from the cavity 43.

When the threaded portions 49, 59 are both part of what might be termed a unitary structure for inserting such portions 49, 59 into the cavity 43 and withdrawing such portions 49, 59 at the same time and at the same rate, the interior and exterior threads 23, 25 must have the same pitch. On the other hand, if the perimeter section 47 and the plug 53 are supported on separate shaft portions (which would thus be capable of independent rotation with respect to one another), the interior and exterior threads 23, 25 need not be of the same pitch. Clearly, such an arrangement is contemplated by the invention.

While the principles of the invention have been shown and described in connection with a few exemplary embodiments and for making a single exemplary component, e.g., a pump volute 13, having interior an exterior threads 23, 25, it is to be understood clearly that such descriptions are by way of example and are not limiting.

What is claimed is:

1. A method for making a component having interior and exterior threads, such method including the steps of:

providing a thread-forming apparatus having a first threaded portion for forming the exterior threads and a second threaded portion for forming the interior threads, the portions defining a space therebetween;

filling the space with a flowable material;

permitting the material to solidify and form the component;

holding the component stationary; and rotating the apparatus, thereby separating the apparatus from the interior and exterior threads while the component is stationary.

2. The method of claim 1 wherein the providing step includes the steps of:

providing a thread-forming apparatus having a pocket therein which is bounded by the first threaded portion; and providing a plug secured in the pocket, the plug including the second threaded portion.

3. The method of claim 2 wherein:

the threaded portions have generally equal lengths and have substantially the same thread pitch along such lengths;

the first threaded portion has a thread crest;

the second threaded portion has a thread root; and the crest and the root are substantially in registry with one another along the length of the threaded portions.

4. The method of claim 2 wherein the step of providing a plug secured in the pocket includes:

placing the plug in the pocket; and securing the plug in the pocket to prevent relative plug-pocket rotation.

5. The method of claim 1 wherein the rotating step includes rotating the first and second threaded portions simultaneously while holding the component stationary.

6. The method of claim 5 wherein:

the thread-forming apparatus is provided in a cavity for molding the component; and rotation is in a direction to move the threaded portions away from the cavity.

7. The method of claim 5 wherein:

the thread-forming apparatus is provided in a cavity for molding the component; and rotation is in a direction to unscrew the threaded portions from the component.

8. A thread-forming apparatus for making a component having interior and exterior threads, such apparatus being mounted for rotational movement and including:

a perimeter section having a pocket and a first threaded portion for forming the exterior threads;

a plug in the pocket and having a second threaded portion spaced from the first threaded portion for forming the interior threads, such plug being axially fixed with respect to the perimeter section.

9. The apparatus of claim 8 wherein:

the threaded portions have generally equal lengths and substantially the same thread pitch along such lengths;

the first threaded portion has a thread crest;

the second threaded portion has a thread root; and the crest and the root are substantially in registry with one another along the length of the threaded portions.

10. The thread-forming apparatus of claim 8 wherein the plug is removable from the pocket and the perimeter section and the plug include holes for receiving a pin fixing the plug in the pocket.

* * * * *